US008972569B1

(12) United States Patent
D'Esposito

(10) Patent No.: US 8,972,569 B1
(45) Date of Patent: Mar. 3, 2015

(54) REMOTE AND REAL-TIME NETWORK AND HTTP MONITORING WITH REAL-TIME PREDICTIVE END USER SATISFACTION INDICATOR

(76) Inventor: John J. D'Esposito, Wayside, NJ (US)

(*) Notice: Subject to any disclaimer, the term of this patent is extended or adjusted under 35 U.S.C. 154(b) by 369 days.

(21) Appl. No.: 13/432,081

(22) Filed: Mar. 28, 2012

Related U.S. Application Data

(60) Provisional application No. 61/526,312, filed on Aug. 23, 2011.

(51) Int. Cl.
*G06F 15/173* (2006.01)

(52) U.S. Cl.
USPC ............................ 709/224; 709/225; 709/226

(58) Field of Classification Search
CPC ............................................... H04L 29/06884
USPC .......................... 709/223, 224, 238, 204, 231
See application file for complete search history.

(56) References Cited

U.S. PATENT DOCUMENTS

| | | | |
|---|---|---|---|
| 6,502,131 B1* | 12/2002 | Vaid et al. ................... | 709/224 |
| 6,757,253 B1 | 6/2004 | Moran, III et al. | |
| 6,857,020 B1* | 2/2005 | Chaar et al. .................. | 709/226 |
| 7,319,847 B2 | 1/2008 | Xanthos et al. | |
| 7,359,835 B2 | 4/2008 | Vogel et al. | |
| 7,823,155 B2 | 10/2010 | Misra et al. | |
| 7,937,470 B2* | 5/2011 | Curley et al. ................ | 709/226 |
| 8,717,916 B2* | 5/2014 | Jagadeeswaran et al. .... | 370/252 |
| 2002/0152303 A1 | 10/2002 | Dispensa | |
| 2002/0198984 A1* | 12/2002 | Goldstein et al. ............. | 709/224 |
| 2003/0161265 A1 | 8/2003 | Cao et al. | |
| 2004/0215768 A1* | 10/2004 | Oulu et al. ................... | 709/224 |
| 2006/0212486 A1* | 9/2006 | Kennis et al. ................. | 707/200 |
| 2006/0224730 A1 | 10/2006 | Fok et al. | |
| 2007/0061451 A1* | 3/2007 | Villado et al. ................ | 709/224 |

(Continued)

FOREIGN PATENT DOCUMENTS

GB 2401283 6/2005

OTHER PUBLICATIONS

Staircase 3, Inc., "Open Signal Maps", https://market.android.com/details?id=com.staircase3.opensignal&feature=search_result; Jul. 2011.

(Continued)

*Primary Examiner* — Jeffrey M Rutkowski
*Assistant Examiner* — Abdelnabi Musa
(74) *Attorney, Agent, or Firm* — North Shore Patents, P.C.; Michele Liu Baillie

(57) ABSTRACT

In real-time network transaction monitoring, a mobile device receives instruction sets for executing and monitoring business transactions over networks. The instruction sets define steps of business transactions and transport protocol events to record. Each transport protocol event includes an incident marking a start, a change, or a completion of a state according to a transport protocol during the execution of the business transaction. During the execution of the business transactions, the transport protocol events are recorded, associated with location and network connectivity data for the mobile device, and stored as historical data. When a web system receives a request for a real-time predictive end-user satisfaction indicator, the web system retrieves the historical data matching the input parameters in the request and predetermined parameters, calculates an Apdex and a real-time mobile performance index using the retrieved historical data, and returns both indexes as the real-time predictive end-user satisfaction indicator.

34 Claims, 7 Drawing Sheets

(56) References Cited

U.S. PATENT DOCUMENTS

| | | | |
|---|---|---|---|
| 2007/0083649 A1 | 4/2007 | Zuzga et al. | |
| 2007/0266149 A1* | 11/2007 | Cobb et al. | 709/224 |
| 2008/0155089 A1* | 6/2008 | Hunt et al. | 709/224 |
| 2009/0193112 A1* | 7/2009 | Sengupta et al. | 709/224 |
| 2011/0022707 A1* | 1/2011 | Bansal et al. | 709/224 |

OTHER PUBLICATIONS

Sensorly.com, "Sensorly", https://market.android.com/details?id=com.sensorly.viewer&feature=related_apps; May 2011.

Akvelon, Inc., "Signal Finder", https://market.android.com/details?id=com.akvelon.signaltracker&feature=also_installed; Jun. 2011.

St Murray, "Cell Connectivity Tracker", https://market.android.com/details?id=org.stmurray.CellConnectivityTracker&feature=also_installed; Jan. 2011.

Parizene, "Netmonitor", https://market.android.com/details?id=com.parizene.netmonitor&feature=related_apps; Jul. 2011.

Fazio, S., "SpeedTest", https://market.android.com/details?id=com.parizene.netmonitor&feature=related_apps; Mar. 2011.

* cited by examiner

REMOTE AND REAL-TIME NETWORK AND HTTP MONITORING WITH REAL-TIME PREDICTIVE END USER SATISFACTION INDICATOR

CROSS-REFERENCE TO RELATED APPLICATIONS

The present application claims priority to U.S. provisional patent application Ser. No. 61/526,312, filed on Aug. 23, 2011.

BACKGROUND OF THE INVENTION

Currently mobile web application owners and developers are unable to understand the responsiveness, speed, and health of their applications when deployed on mobile devices and accessed through cellular and WiFi networks distributed throughout the world. Mobile application owners, developers, and/or cellular network carriers are currently unable to consistently and repeatedly capture low level, real-time performance data on the network during an execution of a transaction, such as: how network latency or packet loss affects mobile application business transaction response time; how a particular cellular carriers' response times for a specific mobile application and mobile business transactions compare with other cellular carriers' response times; and what specific physical locations throughout the world produces high latency, packet loss and slow HTTP(s) response time.

An existing solution captures low level networking parameters such as packet loss and latency. However, this data is retrieved only for a single URL or hostname. It does not maintain state with the origin systems and does not execute a transaction with business context. None of the existing solutions monitors and captures data for an HTTP(s) transaction with persistence and in a business context. Nor do they provide granular HTTP(s) and TCP/IP metrics such as DNS lookup time, connect time, SSL connect time, redirect time, first byte time, last byte time. Without this granular data, mobile web application owners and developers are unable to determine how an application responds on a specific cellular carrier network, cellular wireless generation, location of the mobile device, or transaction type and time of day. Further, they are unable to determine granular HTTP and TCP/IP response times of HTTP transactions by type (POSTS, GETS, Audio, Video, Streaming) for a specific mobile carrier, mobile service level, mobile device hardware, mobile device OS level, or device location and time of day.

BRIEF SUMMARY OF THE INVENTION

According to one embodiment of the present invention, a method for remote and real-time network transaction monitoring by a mobile device comprises: (a) receiving an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction; (b) obtaining location and network connectivity data for the mobile device; (c) during the execution of each step of the business transaction, recording the transport protocol events according to the configuration parameters; and (d) associating the recorded transport protocol events with the location and network connectivity data for the mobile device.

In one aspect of the present invention, the method may be implemented as a stand-alone mobile application on the mobile device, or as an Application Programming Interface embedded within a mobile application.

In one aspect of the present invention, the transport protocol events comprises: an amount of time for the mobile device to establish a connection with a remote web system; an amount of time for the mobile device to negotiate a secure sockets layer handshake; an amount of time for one or more redirects to occur; an amount of time for the mobile device to receive a first byte of data from a web system to which the mobile device connects for the business transaction; and an amount of time for the mobile device to receive a last byte of data from the web system.

In one aspect of the present invention, the receiving (a) comprises: (a1) receiving, by the processor, a list of instruction sets from a server system, each given instruction set on the list comprising settings for steps of a given business transaction and configuration parameters for transport protocol events to record for each step of the given business transaction.

In one aspect of the present invention, each given instruction set on the list, the obtaining (b) comprises: (b1) obtaining, by the processor, the location and network connectivity data for the mobile device for the given instruction set; (b2) performing, by the processor, latency and packet loss tests for the given instruction set; and (b3) calculating, by the processor, a latency and a packet loss for the given instruction set according to results of the latency and packet loss tests.

In one aspect of the present invention, for each given step of the business transaction, the recording (c) comprises: (c1) executing, by the processor, the given step of the business transaction according to the settings for the given step in the given instruction set; (c2) capturing, by the processor, the transport protocol events for the given step according to the configuration parameters for the given step in the given instruction set; and (c3) calculating, by the processor, metrics for the given step using the captured transport protocol events.

In one aspect of the present invention, the recording (c) further comprises: (c4) calculating, by the processor, total transaction metrics for the business transaction using the calculated metrics for each given step of the business transaction.

In one aspect of the present invention, the associating (d) comprises: (d1) associating, by the processor, the calculated total transaction metrics with the mobile device location and network connectivity data.

In one aspect of the present invention, the method further comprises: (e) displaying, by the processor, one or more of the calculated total transaction metrics on the mobile device.

In one aspect of the present invention, the method further comprises: (e) storing, by the processor, the recorded transport protocol events associated with the mobile device location and network connectivity data as historical network monitoring data.

In one aspect of the present invention, the method further comprises: (f) receiving a request for a real-time predictive end-user satisfaction indicator, the request comprising input parameters to be used for the indicator; (g) retrieving the historical network monitoring data matching the input parameters in the request; (h) retrieving the historical network monitoring data matching one or more predetermined parameters; (i) calculating an Apdex using the retrieved historical network monitoring data matching the input parameters in the request; (j) calculating a real-time mobile performance index using the retrieved historical network monitoring data matching the predetermined parameters; and (k) returning the real-time predictive end-user satisfaction indicator comprising the calculated Apdex and the calculated real-time mobile performance index.

In one aspect of the present invention, the input parameters comprise one, or a combination of one or more, of the following: a network carrier name; a latitude and longitude of a location of a second mobile device; an altitude of the second mobile device; a time zone offset; a day of the week; a time of day; a cellular generation; a request direction; a payload size; a protocol; a target time; and a response format.

In one aspect of the present invention, the predetermined parameters comprise one or more of the following: a payload size; a sample size; and a request direction.

In one aspect of the present invention, the request further comprises a request for an advertisement delivery determination rating (ADDR) for indicating an advertising media type for an advertisement to be sent to the mobile device, and the method further comprises: (l) calculating, by the processor of the server, the ADDR using the Apdex, the real-time mobile performance index, and the retrieved historical network monitoring data matching the predetermined parameters; and (m) returning, by the processor of the server, the ADDR in response to the request.

According to another embodiment of the present invention, a method for providing a real-time predictive end-user satisfaction indictor by a web system comprises: (a) receiving, by the processor, a request for a real-time predictive end-user satisfaction indicator, the request comprising input parameters to be used for the indicator; (b) retrieving, by the processor, historical network monitoring data matching the input parameters in the request, wherein the historical network monitoring data comprises transport protocol events recorded during executions of steps of business transactions over networks by a plurality of mobile devices, wherein each transport protocol event comprises an incident marking a start of a state, a change of a state, or a completion of a state according to a transport protocol during the executions of the business transactions; (c) retrieving, by the processor, historical network monitoring data matching one or more predetermined parameters; (d) calculating, by the processor, an Apdex using the retrieved historical network monitoring data matching the input parameters in the request; (e) calculating, by the processor, a real-time mobile performance index using the retrieved historical network monitoring data matching the predetermined parameters; and (f) returning, by the processor, the real-time predictive end-user satisfaction indicator comprising the calculated Apdex and the calculated real-time mobile performance index.

Computer program products corresponding to the above-summarized methods are also described and claimed herein.

In another embodiment of the present invention, a system comprises: a plurality of mobile devices, each mobile device comprising a processor and a computer readable memory device having computer readable program code embodied therewith, the computer readable program code configured to: receive an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction; obtain location and network connectivity data for the mobile device; during the execution of each step of the business transaction, record the protocol events according to the configuration parameters; associate the recorded transport protocol events with the location and network connectivity data for the mobile device; and send to a server system the recorded transport protocol events associated with the mobile device location and network connectivity data; and the server system comprising a storage for storing the recorded transport protocol events associated with the mobile device location and network connectivity data, received from each of the mobile devices, as historical network monitoring data.

In another embodiment of the present invention, a web system comprises: a processor; a storage storing historical network monitoring data comprises transport protocol events recorded during executions of steps of business transactions over networks, wherein each transport protocol event comprises an incident marking a start of a state, a change of a state, or a completion of a state according to a transport protocol during the executions of the business transactions by a plurality of mobile devices; and a computer readable memory device having computer readable program code embodied therewith, the computer readable program code configured to: receive a request for a real-time predictive end-user satisfaction indicator, the request comprising input parameters to be used for the indicator; retrieve the historical network monitoring data matching the input parameters in the request; retrieve the historical network monitoring data matching one or more predetermined parameters; calculate an Apdex using the retrieved historical network monitoring data matching the input parameters in the request; calculate a real-time mobile performance index using the retrieved historical network monitoring data matching the predetermined parameters; and return the real-time predictive end-user satisfaction indicator comprising the calculated Apdex and the calculated real-time mobile performance index.

DETAILED DESCRIPTION OF THE INVENTION

Figure 1:
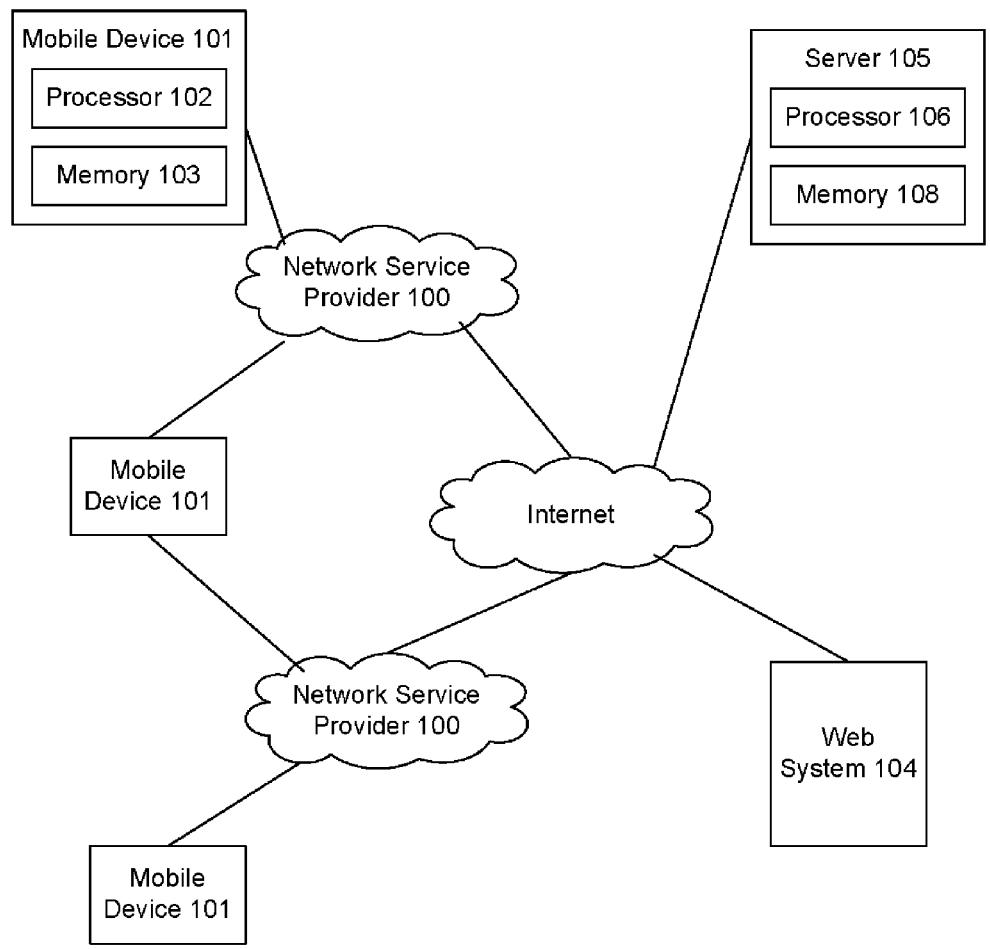
FIG. 1 illustrates an embodiment of a system for remote and real-time network transaction monitoring according to the present invention.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 illustrates an embodiment of a system for remote and real-time network transaction monitoring according to the present invention. The system comprises a plurality of network service providers 100, such as cellular and/or WiFi service providers, that connect mobile devices 101 to web-based network services provided by a web system 104. Each mobile device 101 is operationally coupled to a processor 102 and a computer readable medium, such as a memory 103. The system further comprises a server 105 or server system operationally coupled to a processor 106 and a computer readable medium, such as a memory 108. The computer readable media 103, 108 of the mobile devices 101 and the server 105 stores computer readable program code for implementing the various embodiments of the present invention, as described below.

The server system 105 may be implemented as several horizontally clustered, globally deployed N-tiered web systems that: provide the instructions for the mobile devices 101 to perform; receive and process data from the mobile devices 101; displays historical data; configures constructs for the testing to be performed; and hosts a web-service that provides a real-time performance indicator.

The embodiments of the present invention may be provided as a stand-alone mobile application or as an application program interface (API) that is embedded within a mobile application. The mobile application is installed on the mobile device(s) 101 either manually via a direct connection or through an online store application. The stand-alone mobile application runs in the background once it is started. As an API embedded within a mobile application, the developer and/or application owner has the option to run the monitoring asynchronously in the background as an Automated Recurring process and/or synchronously in "On-Demand" fashion. The mobile application uses HTTPS to communicate with the system web infrastructure to obtain instructions pertaining to a monitoring of a business transaction. As used in this specification, a business transaction comprises a series of steps that are executed within a business context and maintains state with the origin web system. For example, a business transaction includes a series of steps that an end user would execute to complete a business task, such as a purchase of a product. The steps of the business transaction, and the testing to be performed during execution of the steps, are presented as instruction sets, referred to herein as "probes". A probe contains high level parameters that provide instructions on how each step in the business transaction is to be executed, as well as granular instructions and configuration parameters on how to best to execute each step within the business transaction. Upon receipt of a probe, the mobile application executes each step defined within the probe to the remote web system 104. The mobile device 101 processes and sends the results to the server 105. The results comprise transport protocol events recorded during real-time executions of each step defined in the probe. The real-time execution, in this specification, refers to the execution of the business transaction steps in a real-use situation, versus a simulated or test environment. A transport protocol event, in this specification, comprises noteworthy and/or vital incidents at the protocol level that occurs when each step is executed, including an incident or observation marking the start of a state or status, change of a state or status, or a completion of a state or status according to a transport protocol during the execution of the business transaction. Examples of transport protocol events include that start of the execution of the test, when protocol connects with the origin system, and when the first byte was received by the mobile device form the origin infrastructure, i.e., the server system to which the mobile device will connect.

Figure 2:
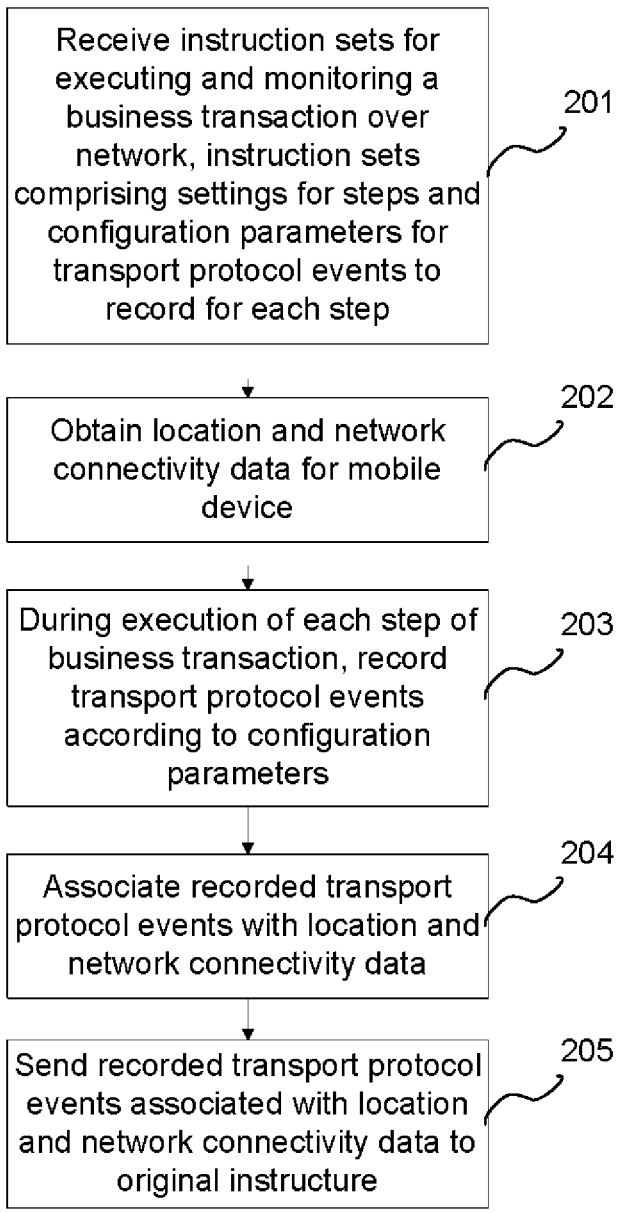
FIG. 2 is a flowchart illustrating an embodiment of a method for remote and real-time network transaction monitoring according to the present invention.

FIG. 2 is a flowchart illustrating an embodiment of a method for remote and real-time network transaction monitoring according to the present invention. By recording transport protocol events in this manner, a user or enterprise is able to monitor and measure the health and response time of web based business transaction on a granular level. In this embodiment, the transport protocol events recorded comprises low level HTTP(s) statistics, including, but are not limited to, one or more of the following:

DNS Lookup Time—The amount of time required to perform a Domain Name Services lookup of the host name being used for a specific process Connect Time—The amount of time it takes to open a TCP/IP socket from the mobile device to the origin web system SSL Connect Time—The amount of time it takes for the SSL handshake negotiation to complete between the mobile device and the origin web system Redirect Time—The amount of time it takes for the client to receive an HTTP 302 redirect from the origin web system First Byte—The amount of time it takes for the mobile device to receive the first byte of data from the origin web system Last Byte—The amount of time it takes for the mobile client to receive the last byte of data from the origin web system Content Download—The amount of time it takes for the mobile device to receive the all of the content sent by the origin web system Embodiments of the present invention may be implemented as a stand-alone mobile application or an Application Programming Interface (API) embedded within a mobile application. The stand-alone mobile application runs in an automated recurring mode, and the API within the mobile application may run in the automated recurring mode or an on-demand monitoring mode. In the automated recurring mode, the mobile application can be run in the background on a mobile device 101 in a recurring fashion. Once started, the mobile application continuously communicates with the origin infrastructure. In the on-demand mode, the API within the mobile application can invoke the monitoring of a business transaction in a synchronous fashion. Once invoked, the mobile application will receive instruction sets for executing and monitoring a business transaction over a network (201). The instructions comprise settings for one or more steps of the business transaction and configuration parameters for transport protocol events to record for each step of the business transaction. Upon receiving a probe, the mobile application obtains a location and network connectivity data for the mobile device 101 (202). The mobile application then executes each step of the business transaction and records the transport protocol events and timings during the execution according to the instructions (203). The mobile application associates the recorded transport protocol events with the location and network connectivity data (204), and sends the recorded transport protocol events, and the associated location and network connectivity data, to the origin infrastructure (205). Unlike the automated recurring mode, in the on-demand mode, the mobile application terminates the current thread of execution once the recorded transport protocol events are sent.

In this embodiment, the transport protocol events may capture all request and response HTTP headers generated for each step when executed. The customer can then inspect these granular HTTP headers at a later time to obtain a more detailed understanding of HTTP conversation between the mobile device and customer's remote web system. Latency, packet loss, HTTP request/response, IP carrier, location, time, response time, SSL negotiation and cellular wireless generation data are sent to the server 105 and maintained for analysis by customers.

The present invention may be deployed on any number of mobile devices. This empowers a customer to monitor and measure the health and response time of their mobile based HTTP requests from any location that has cellular or WiFi connectivity, including private, internal wireless networks, and business transactions that use the internally managed WiFi networks.

In this way, the mobile application empowers a customer to perform mobile based network and HTTP monitoring and testing on actual cellular carrier networks. Either through globally owned and deployed system devices or through their own mobile devices, a customer can test their HTTP business transactions in the field at any location the mobile device has cellular or WiFi connectivity. A customer can directly compare the speed and fidelity of competing cellular carrier and/or WiFi provider networks.

Figure 3:
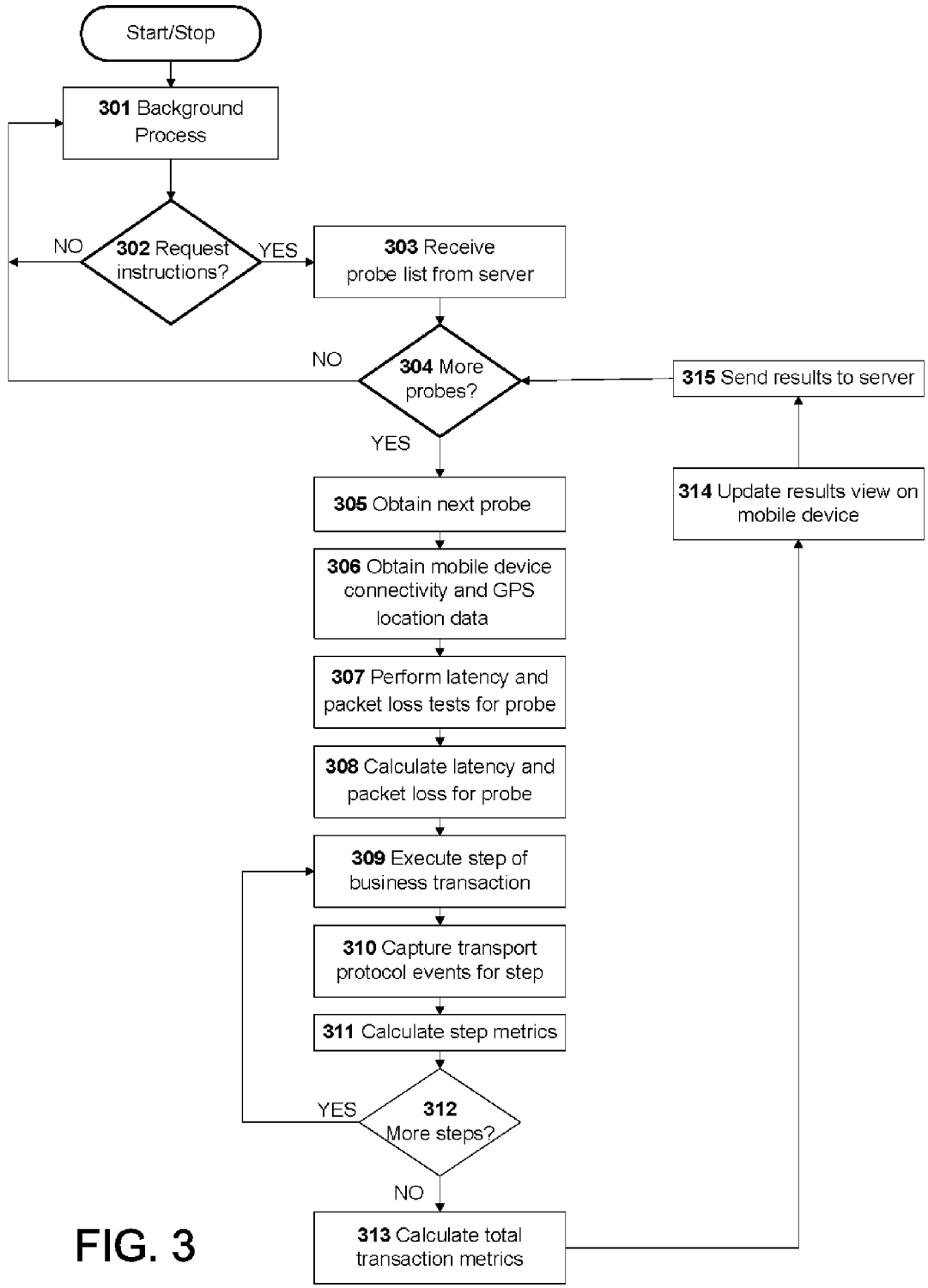
FIG. 3 is a flowchart illustrating in more detail the embodiment of the method for remote and real-time transaction monitoring for a network according to the present invention.

FIG. 3 is a flowchart illustrating in more detail the embodiment of the method for remote and real-time transaction monitoring for a network according to the present invention. A mobile device 101 initiates the mobile application, and the mobile application begins running in the background (301). In this embodiment, the mobile application sends a request to the server system 105 for instruction sets (302). In response, the mobile application receives a list of probes from the server system 105 (303). Alternatively, the mobile device 101 may have the capability to obtain the instruction sets locally, either by defining the instruction sets via an interface on the mobile device or obtaining the instruction sets via a direct communication link with another device. In this alternative embodiment, the sending of the request may not be required. As explained above, a probe comprises instructions sets including instructions for one or more steps of a business transaction and configuration parameters for transport protocol events to be recorded for testing during the execution of the steps. The instructions for the steps of the business transaction include parameters and values for how each step is to be executed. Example parameters within a probe include any combination of the following:

Probe Name—A unique name for the probe

Probe Identifier—An alpha-numeric unique identifier for the probe

Account Identifier—An alpha-numeric unique identifier for the account email Alert—a list of emails to be alerted in the event an error occurs and the customer wants to be notified Text Message Alert—a list of telephone numbers to be used to send text messages in the event an error occurs and the customer wants to be notified Telephone Call Alert—a list of telephone numbers to be used to place telephone calls in the event an error occurs and the customer wants to be notified Probe Type—A value that indicates the type of probe. (A single URL, business transaction, soap web service)

Network Test Host—The host name to be used for packet loss and latency testing.

Number of ICMP Pings—The number ICMP pings to execute during network tests

Number of HTTP Pings—The number http pings to execute during network tests

ICMP Packet Loss Time Out—The amount of time (seconds) to wait for an ICMP ping to mark a packet is lost.

HTTP Packet Loss Time Out—The amount of time (seconds) to wait for an http ping to mark a packet is lost.

Transaction—The transaction contains one of more http(s) based steps to be executed in series. During this process the mobile application maintains state or is persistent with the remote web systems by maintaining cookies and context. For instance, the transaction may represent a mobile user logging into a remote web application. After logging into the application, the user may perform several steps that make up a transaction, such as searching a catalog, adding items to a shopping cart and checking out. Together all of the steps comprise a business transaction.

Each of the following represents sub-components of the transaction embedded within the probe definition:

Step Identifier—A unique identifier for the step beginning with zero

Step Name—A unique name for the step

URL—The URL to be accessed when the step is executed

Connection Type—The type of http connection to be used (GET, POST, PUT, etc).

Encoding Type—If the connection type is POST, this parameter represents the type of encoding used POST. URL Encoded or multipart (rfc 1867 compliant)

POST Parameters—name/value pairs that represent parameters to be POST-ed to the remote web system File Upload Parameters—one or more key-value pairs that represent the name and location of a file(s) to be uploaded Follow Redirects—a flag that instructs the mobile monitoring application to follow http 302 redirects if encountered as a response from the remote web system Additional Headers—one or more key-value pairs that represent http header names and values.

Once the list of probes is received, the mobile application obtains the next/first probe on the list (304 and 305). The mobile application obtains data about the mobile device 101, the current network connectivity of the mobile device 101, and the GPS location of the mobile device 101 (306). Using native operating system APIs, the data obtained may include, but are not limited to, one or more of the following:

Device Id—The unique identifier of the mobile device;

Time Zone Offset—an offset from GMT for the time zone currently configured for the device;

Current Latitude—The current latitude of the device;

Current Longitude—The current longitude of the device;

Current Altitude—The current altitude of the device;

Device Platform—The platform and software version of the device

IP Address—The IP Address of the device

RSSI Maximum—The maximum Received Signal Strength. Indication value

RSSI Minimum—The minimum Received Signal Strength Indication value

RSSI Average—The average Received Signal Strength Indication values

RSSI Standard Deviation—The Standard Deviation of the Received Signal Strength values Wi-Fi Network Type—If Wi-Fi network is available, the type of network;

Wi-Fi Network Subtype—If Wi-Fi network is available, the sub type of the network;

Wi-Fi Network Connected—True/False indicating whether the device is connected to a Wi-Fi network;

Wi-Fi Network Available—True/False indicating whether a network is available;

Wi-Fi Network Failover—True/False indicating whether the Wi-Fi network is a failover;

Mobile Network Type—If Mobile network is available, the type of network;

Mobile Network Subtype—If Mobile network is available, the sub type of the network;

Mobile Network Connected—True/False indicating whether the device is connected to a Mobile network;

Mobile Network Available—True/False indicating whether a Mobile network is available;

Mobile Network Failover—True/False indicating whether the Mobile network is a failover;

Mobile Operator Name—The name of the mobile operator;

Mobile Operator Id—A unique identifier for the mobile operator; and

Data State—an indicator whether or not the device is connected for data usage.

The latency and packet loss tests are then performed for the probe (307). A series Internet Control Message Protocol (ICMP) echo requests are used to determine the latency and packet loss between the mobile device and origin host. Each probe definition contains parameters that determine low-level ICMP echo packet loss and latency request configuration settings, including one or more, but not limited to, the following:

ICMP Network Test Host—The destination host name for the ICMP echo request

ICMP Number of Pings (N)—The number of consecutive ICMP echo requests

ICMP Packet Loss Time Out—The amount of time (seconds) to wait for ping to mark a packet is lost.

N (Number of Ping)

ICMP echo requests are executed in series from the mobile device to the Network Test Host. For each request difference of the (completion time–the start time) is calculated and stored in memory as the latency of the request. If the amount of time for a response to be received exceeds the "Packet Loss Time Out" time, the request is marked as a "Loss".

The latency and packet loss results are then calculated from the completed latency data (308). In this embodiment, the results include the average latency, standard deviation of the latency, and the maximum latency and minimum latency of ICMP packet loss and latency. These values are then stored in memory, which include, but are not limited to, one or more of the following:

ICMP Maximum Latency—The maximum round trip time for one packet to travel from the mobile device to the network test and back ICMP Minimum Latency—The minimum round trip time for one packet to travel from the mobile device to the network test and back ICMP Average Latency—The average round trip time for one packet to travel from the mobile device to the network test and back ICMP Latency Standard Deviation—The standard deviation of the latency responses ICMP Packet Loss is the percentage of packets lost or not received within the "Packet Loss Time Out" time period when a series of ICMP echo requests are sent. The Packet Loss is calculated as a percentage by using the following formula: (Total Number of Unsuccessful Requests/Total Number of Requests)×100. This value is stored in memory as the packet loss for this probe.

A series of Hyper Text Transport Protocol (HTTP) requests are used to determine the latency and packet loss between the mobile device and origin host. Each probe definition contains parameters that determine low-level HTTP packet loss and latency request configuration settings, including but not limited to:

- HTTP Network Test Host—The destination host name for the HTTP packet loss/latency request
- HTTP Number of Pings (N)—The number of consecutive the HTTP packet loss/latency requests
- HTTP Packet Loss Time Out—The amount of time (seconds) to wait the HTTP packet loss request to mark a packet is lost.

N (Number of HTTP) HTTP packet loss/latency requests are executed in series from the mobile device to the Network Test Host. For each request difference of the (completion time–the start time) is calculated and stored in memory as the latency of the request. If the amount of time for a response to be received exceeds the "Packet Loss Time Out" time, the request is marked as a "Loss".

Average Latency, Standard Deviation of the Latency, Maximum Latency and Minimum Latency of HTTP packet loss and latency results are calculated from the completed latency data stored in memory. These values are then stored in memory, which include, but are not limited to, one or more of the following:

- HTTP Maximum Latency—The maximum round trip time for one http request to travel from the mobile device to the network test and back
- HTTP Minimum Latency—The minimum round trip time for one http request to travel from the mobile device to the network test and back
- HTTP Average Latency—The average round trip time for one http request to travel from the mobile device to the network test and back
- HTTP Latency Standard Deviation—The standard deviation of the http packet loss/latency responses.

HTTP Packet Loss is the percentage of packets lost or not received within the "HTTP Packet Loss Time Out" time period when a series of HTTP packet loss/latency requests are sent. The HTTP Packet Loss is calculated as a percentage by using the following formula: (Total Number of Unsuccessful Requests/Total Number of Requests)×100. This value is stored in memory as the packet loss for this probe.

Once ICMP and HTTP Latency and Packet Loss tests and calculations are completed, the mobile application begins the process of executing one or more steps contained within the HTTP(s) transaction (309). The mobile application captures or records the transport protocol events for each step (310). In this embodiment, the probe is in XML format, and a transaction/> stanza of the probe contains detailed instructions to formulate and execute one more HTTP(s) requests. Each HTTP(s) request is represented within the <transaction/> stanza as a step of the business transaction. Each step contains a set of parameters that determines low-level HTTP(s) request configuration settings. They provide input for setting the required HTTP(s) protocol's http session, request message. The request message is made up of the request line, headers, and request-type. The step parameters are used in the following manner:

URL Request Parameter
- Secure Sockets Layer (SSL)—Determines whether or not the http(s) request should initiate an SSL based transmission control protocol (TCP)
- Port—Instructs the http(s) request to communicate using a specific port to origin host.
- Uniform Resource Indicator—Provides the value for the uniform resource indicator sent within the request line of the http(s) request message Connection Type
- Request Method—Provides the value for the request type sent within the request line of the http(s) request message Encoding Type
- Content-Type—Provides input for the content-type header that instructs the origin server how to decode the http(s) request.

Post Parameters
- http(s) request body key-value pairs used when uploading a file or submitting a form File Upload Parameters
- File location and name inputs used when an rfc1867 compliant file upload POST http request is sent
- Used to construct the data encapsulated by the MIME boundaries within the body of multi-part http(s) request Follow Redirects
- A binary switch used that instructs the http(s) construct to immediately execute an http(s) redirect request if an http(s) redirect response code is received as a result of an http(s) request Additional Headers
- One or more key-value pairs used for overriding, adding or customizing http(s) headers sent with an http(s) request's request message Expected Response Content
- One or more values used during an "Expected Response Content" test. A test is performed after the response is received. These values are searched within the returned content. If one of the values is not present, an "Expected Response Content" error is generated.

Unexpected Response Content
- One or more values used during an "Unexpected Response Content" test. A test is performed after the response is received. These values are searched within the returned content. If one of the values is not present, an "Unexpected Response Content" error is generated.

Using the configuration parameters provided for this step, a compliant HTTP(S) request is generated. Granular timing data and content are captured for one or more of the following events that occur as part of the HTTP(s) conversation:

- DNS Lookup—when a Domain Name Services request is required to translate a host name into an IP Address
- Connected—when a TCP/IP connection completes or fails;
- Connection Status—when a TCP/IP connection changes state;
- SSL Server Authentication—when an SSL server certificate is received;
- SSL Status—when SSL messages are sent and received;
- Start Transfer—when data starts transferring;
- Transfer—when data is transferred;

End Transfer—when the transfer is complete;
Set Cookie—when a cookie is set;
Header—when a header is received;
Redirect—when an http redirect is received;
Error—when an error occurs; and
Disconnected—when the connection is closed.

The granular timing data and content data captured for this step are stored in memory.

After the HTTP(S) Request completes or fails for this step, the step's metrics are calculated (311) using the granular timing data and content data stored in memory when the HTTP(S) request was executed. The following represents detailed results obtained and or calculated for the step and stored in memory:

Step Identifier—A unique identifier for the step beginning with zero

Step Name—A unique name for the step

Step URL—The URL that was executed for this step

Step Truncated URL—A truncated version of the URL used for display purposes

Step Response Code—The http 1.0 or 1.1 response code header received for this step Step Duration—The total elapsed time for the step Step DNS Lookup Duration—The total amount of time to perform a Domain Name Services lookup if one was required.

Step Connect Duration—The total elapsed time for the mobile device to establish a socket connection with the remote host Step SSL Connection Duration—The total elapsed time for the mobile devices to negotiate an SSL conversation with the remote host Step Redirect Duration—The total elapsed time for the mobile device to receive an http 302 redirect from the remote host Step First Byte Duration—The total elapsed time for the mobile device to receive the first byte from the remote host Content Download Duration—The difference in time from when the last byte was received and the first byte was received for the response for this step Step Request Bytes Transferred—The total amount of bytes transferred for the for the request of this step Step Response Bytes Transferred—The total amount of bytes received within the response of this step.

Request Headers—A delimited string representation of all the headers sent with the request of this step Response Headers—A delimited string representation of all of the headers received with the response of this step Expected Response Content Disposition—A "True" or "False" indicator of the result of an "Expected Response Content" test Expected Response Content Detail—Contains the values of the expected response content not found when an expected response content test fails.

Unexpected Response Content Disposition—A "True" or "False" indicator of the result of an "Unexpected Response Content" test Unexpected Response Content Detail—Contains the values of the unexpected response content found when an unexpected response content test fails.

After all steps within the transaction have been executed for the probe (312), the total transaction's metrics are calculated, associated with the mobile device connectivity and GPS location data, and stored in memory (313). The HTTP(S) transactions results include, but are not limited to, one or more of the following:

Final Disposition—The final disposition of the HTTP(s) transaction

Final Error Type—If an error occurred, represents a high level error type

Final Error Detail—If an error occurred, represents the details of the error

Created—a time stamp of the date and time the HTTP(s) transaction was executed

Total End To End Time—The total time elapsed for the entire HTTP(S) transaction

Total DNS Lookup Time—The total DNS Lookup time elapsed for all steps within the HTTP(S) transaction Total Connect Time—The total connect time elapsed for all steps within the HTTP(S) transaction Total SSL Connect Time—The total SSL connect time elapsed for all steps within the HTTP(S) transaction Total Redirect Time—The total redirect time elapsed for all steps within the HTTP(S) transaction Total First Byte Time—The total time elapsed for all steps within the transaction for when the first byte was received by the mobile device Total Content Download Time—The total time elapsed for all steps within the HTTP(S) transaction from when the last byte was received minus the first byte received by the mobile device One or more of the following data may be displayed on the mobile devices for viewing (314):

Probe Name—The unique name for the probe

Final Disposition—The final disposition of the HTTP(s) transaction

Final Error Type—If an error occurred, represents a high level error type

Final Error Detail—If an error occurred, represents the details of the error

Created—a time stamp of the date and time the HTTP(s) transaction was executed

ICMP Maximum Latency—The maximum round trip time for one ICMP packet to travel from the mobile device to the network test and back ICMP Minimum Latency—The minimum round trip time for one ICMP packet to travel from the mobile device to the network test and back ICMP Average Latency—The average round trip time for one ICMP packet to travel from the mobile device to the network test and back ICMP Latency Standard Deviation—The standard deviation of the ICMP latency responses ICMP Packet Loss—Percentage of ICMP packets lost or not received within the "Packet Loss Time Out" time period when a series of ICMP echo requests are sent.

HTTP Maximum Latency—The maximum round trip time for one http request to travel from the mobile device to the network test and back HTTP Minimum Latency—The minimum round trip time for one http request to travel from the mobile device to the network test and back HTTP Average Latency—The average round trip time for one http request to travel from the mobile device to the network test and back HTTP Latency Standard Deviation—The standard deviation of the http latency responses HTTP Packet Loss—Percentage of http packets lost or not received within the "Packet Loss Time Out" time period when a series of HTTP packet requests are sent.

In the embodiment of the present invention wherein the mobile application is implemented as a stand-alone mobile application, the mobile device 101 sends the results to the server system 105 (315). The server system 105 can provide a web browser GUI interface in the form of a dashboard for users to inspect the results. In the embodiment of the present invention wherein the mobile application is implemented as an embedded API, the consumer of the API will be able to retrieve the results from the server system 105 through standard API method invocations. In both embodiments, the mobile device 101 will repeat the process (304-315) for each remaining probe on the probe list.

When the present invention is in the asynchronous automated recurring mode, once the probe list is exhausted, the mobile application continuously contacts the server system 105 to receive new instructions (302). When the present invention is in the synchronous on-demand mode, the processing terminates. One or more of the following data elements are sent to the server system 105. The data is made available to customers and used as input to the real-time predictive end user satisfaction indicator service, as described further below.

- Probe Name—A unique name for the probe
- Probe Identifier—An alpha-numeric unique identifier for the probe
- Account Identifier—An alpha-numeric unique identifier for the account
- Device Id—The unique identifier of the mobile device
- Time Zone Offset—an offset from GMT for the time zone currently configured for the device
- Current Latitude—The current latitude of the device
- Current Longitude—The current longitude of the device
- Current Altitude—The current altitude of the device
- Device Platform—The platform and software version of the device
- IP Address—The IP Address of the device
- RSSI Maximum—The maximum Received Signal Strength Indication value
- RSSI Minimum—The minimum Received Signal Strength Indication value
- RSSI Average—The average Received Signal Strength Indication values
- RSSI Standard Deviation—The Standard Deviation of the Received Signal Strength values
- Wi-Fi Network Type—If Wi-Fi network is available, the type of network
- Wi-Fi Network Subtype—If Wi-Fi network is available, the sub type of the network
- Wi-Fi Network Connected—True/False indicating whether the device is connected to a Wi-Fi network
- Wi-Fi Network Available—True/False indicating whether a Wi-Fi network is available
- Wi-Fi Network Failover—True/False indicating whether the Wi-Fi network is a failover
- Mobile Network Type—If Mobile network is available, the type of network
- Mobile Network Subtype—If Mobile network is available, the sub type of the network
- Mobile Network Connected—True/False indicating whether the device is connected to a Mobile network
- Mobile Network Available—True/False indicating whether a Mobile network is available
- Mobile Network Failover—True/False indicating whether the Mobile network is a failover
- Mobile Operator Name—The name of the mobile operator
- Mobile Operator Id—A unique identifier for the mobile operator
- Data State—an indicator whether or not the device is connected for data usage.
- ICMP Maximum Latency—The maximum round trip time for one ICMP packet to travel from the mobile device to the network test and back
- ICMP Minimum Latency—The minimum round trip time for one ICMP packet to travel from the mobile device to the network test and back
- ICMP Average Latency—The average round trip time for one ICMP packet to travel from the mobile device to the network test and back
- ICMP Latency Standard Deviation—The standard deviation of the ICMP latency responses
- ICMP Packet Loss—Percentage of ICMP packets lost or not received within the "Packet Loss Time Out" time period when a series of ICMP echo requests are sent
- HTTP Maximum Latency—The maximum round trip time for one http request to travel from the mobile device to the network test and back
- HTTP Minimum Latency—The minimum round trip time for one http request to travel from the mobile device to the network test and back
- HTTP Average Latency—The average round trip time for one http request to travel from the mobile device to the network test and back
- HTTP Latency Standard Deviation—The standard deviation of the http latency responses
- HTTP Packet Loss—Percentage of http packets lost or not received within the "HTTP Packet Loss Time Out" time period when a series of HTTP packet loss requests are sent For each step within the executed HTTP(S) transaction, one or more of the following data is sent:

- Step Identifier—A unique identifier for the step beginning with zero
- Step Name—A unique name for the step
- Step URL—The URL that was executed for this step
- Step Truncated URL—A truncated version of the URL used for display purposes
- Step Response Code—The http 1.0 or 1.1 response code header received for this step
- Step Duration—The total elapsed time for the step
- Step DNS Lookup Duration—The total DNS Lookup time elapsed for all steps within the HTTP(S) transaction
- Step Connect Duration—The total elapsed time for the mobile device to establish a socket connection with the remote host
- Step SSL Connection Duration—The total elapsed time for the mobile devices to negotiate an SSL conversation with the remote host
- Step Redirect Duration—The total elapsed time for the mobile device to receive an http 302 redirect from the remote host
- Step First Byte Duration—The total elapsed time for the mobile device to receive the first byte from the remote host
- Content Download Duration—The difference in time from when the last byte was received and the first byte was received for the response for this step
- Step Request Bytes Transferred—The total amount of bytes transferred for the for the request of this step
- Step Response Bytes Transferred—The total amount of bytes received within the response of this step Request Headers—A delimited string representation of all the headers sent with the request of this step Response Headers—A delimited string representation of all of the headers received with the response of this step Expected Response Content
  One or more values used during an "Expected Response Content" test. A test is performed after the response is received. These values are searched within the returned content. If one of the values is not present, an "Expected Response Content" error is generated.

Unexpected Response Content
  One or more values used during an "Unexpected Response Content" test. A test is performed after the response is received. These values are searched within the returned content. If one of the values is not present, an "Unexpected Response Content" error is generated.

One or more of the following Total Transaction Metrics are sent:

Final Disposition—The final disposition of the HTTP(s) transaction

Final Error Type—If an error occurred, represents a high level error type

Final Error Detail—If an error occurred, represents the details of the error

Created—a time stamp of the date and time the HTTP(s) transaction was executed

Total End To End Time—The total time elapsed for the entire HTTP(S) transaction

Total Connect Time—The total connect time elapsed for all steps within the HTTP(S) transaction Total SSL Connect Time—The total SSL connect time elapsed for all steps within the HTTP(S) transaction Total Redirect Time—The total redirect time elapsed for all steps within the HTTP(S) transaction Total First Byte Time—The total time elapsed for all steps within the transaction for when the first byte was received by the mobile device Total Content Download Time—The total time elapsed for all steps within the HTTP(S) transaction from when the last byte was received minus the first byte received by the mobile device In one embodiment of the present invention, the data stored via the method described above collectively form historical data which may be leveraged to provide a real-time predictive end-user satisfaction indicator as a web service. This historical data helps predict expected network health, end user satisfaction and http(s) response time. In this embodiment, the web service uses the Apdex application index for its basis of scoring and predicting end user satisfaction, however, other types of indexes may be used as well. Apdex is an industry standard for measuring the satisfaction of a user of an application or service. It's a simplified Service Level Agreement (SLA) solution that gives application owners better insight into how satisfied users are, in contrast to traditional metrics like average which can be skewed by very short or very long response times. Apdex is known in the art and will not be further described here.

The web service returns two end user satisfaction scores, and optionally an advertisement delivery determination rating, to the web service requestor. Using the returned scores, the requestor can predict expected future end user satisfaction and the appropriate advertisement media type that should used based upon the input parameters provided. An Apdex score is returned using all of the input parameters supplied by the requestor. Additionally, a Real Time Mobile Performance Index (herein "RTMPI") score is returned. The RTMPI score differs from the Apdex score in that the RTMPI score is calculated using a subset of predetermined input parameters. An Advertisement Delivery Determination Rating (ADDR) is calculated within an Advertisement Performance Determination Engine based on the Apdex and RTMPI scores and historical performance data.

Figure 4:
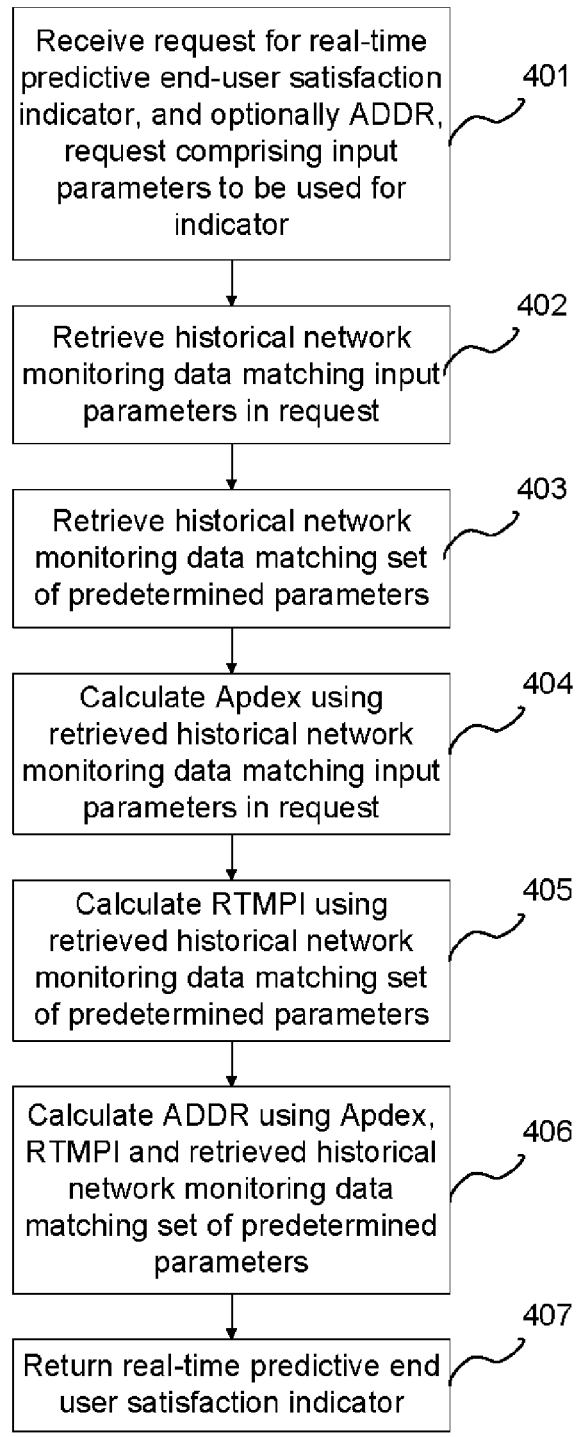
FIG. 4 is a flowchart illustrating an embodiment of a method for providing a real-time predictive end user satisfaction indicator web service according to the present invention.

FIG. 4 is a flowchart illustrating an embodiment of a method for providing a real-time predictive end user satisfaction indicator web service according to the present invention. The method receives a request for the predictive end user satisfaction indicator (401). In this embodiment a HTTP(S) REST like web service is used to receive requests. The request contains parameters that are used by the web service to retrieve appropriate historical data to be used in Apdex calculations. The requestor supplies several input parameters. One or more of the following parameters are used to locate historical response time results to determine the Apdex sample:

Wireless Carrier—The Wireless carrier the request pertains

Device Location (Latitude/Longitude)—GPS latitude and longitude of the device the request pertains Device Altitude—Altitude of Device Time Zone Offset (Optional)—The time zone offset to be used in Web Service calculations Time of Day (Optional)—The time of day to be used in the Web Service calculations Day of Week (Optional)—The day of week to be used in the Web Service calculations Cellular generation (3g/4g, etc)—The generation value for the cellular network being used Request Direction—The direction of the payload transfer (Upload/Download).

Protocol—The TCP/IP Protocol or other standardize transport mechanism used to transfer data. Example: http, websocket, stream, etc.

Payload Size—The size of payload to be used in the Web Service calculations

The following parameters that may be supplied within the request are used to calculate the Apdex:

Target Time—The Target Time in seconds for the Apdex calculation

Frustrated Time—(Optional)—The Frustrated Time in seconds for the Apdex calculation. If omitted the Frustrated Time will be calculated by multiplying the Target Time by 4.

Sample Size—The preferred minimal sample size for the Apdex calculation

The following parameters supplied within the request are used to determine the format of the response:

Response Format—The preferred format of the response (XML, JSON).

The following represents an example of an https REST-Like GET web service:

https://<Techout.com-Host>/tomdex/catherName=<canier-name>&deviceLatitude=<device-latitude>&deviceLongitude<device-longitude>&transactionType=<transaction-type>&timeOfDay=<time-of-day>&timeZoneOffset=<time-zone-offset>&dayOfWeek=<day-of-week>&cellularGeneration=<cellular-generation>&apdexTargetTime=<apdex-target-time-in-seconds>&apdexFrustratedTime=<apdex-frustrated-time-in-seconds>&responseFormat=<response-format>

After a real-time predictive end-user satisfaction indicator request is received, the web service retrieves historical network monitoring data, collected per FIG. 3, matching the input parameters (402). the web service also retrieves historical network monitoring data matching the set of predetermined parameters (403). Thus, in this embodiment, the service retrieves two samples of historical data.

APDEX—Sample 1.

The first sample represents a set of historical data generated using input parameters from the incoming request. The result set from this query is used to calculate an Apdex for the request. One or more of the following parameters provided within the request are used to query the historical data for matching records. The response times of the result set are stored in memory for future use for an Apdex calculation.

Wireless Carrier
    Device Location (Latitude/Longitude)
    Device Altitude (Optional)
    Time Zone Offset (Optional
    Time of Day (Optional)
    Day of Week (Optional)—The day of week to be used in the Web Service calculations
    Cellular generation (3g/4g, etc)
    Request Direction
    Payload Size
    Sample Size RTMPI—Sample 2.

The RTMPI is an index that uses a consistent and predetermined subset of input parameters. A second sample of historical data is obtained for calculating the RTMPI. However, Payload Size, Sample Size and Request Direction are fixed and consistent.

Payload Size—1 Kilobyte
    Sample Size—100
    Request Direction—Down

The fixed parameters used within the sample 2 for the RTMPI query are subject to change. The following parameters provided within the request are used to query the historical data for matching records.

Wireless Carrier
    Device Location (Latitude/Longitude)
    Device Altitude (Optional)
    Time Zone Offset (Optional
    Time of Day (Optional)
    Day of Week (Optional)—The day of week to be used in the Web Service calculations
    Cellular generation (3g/4g, etc)

Figure 5:
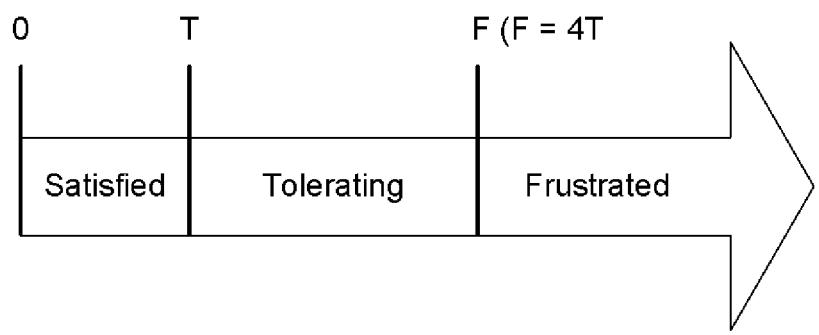
FIG. 5 illustrates an example Apdex index.

As illustrated in FIG. 5, the Apdex index is based on three zones of application responsiveness:

Satisfied: The user is fully productive. This represents the time value (T seconds) below which users are not impeded by application response time.

Tolerating: The user notices performance lagging within responses greater than T, but continues the process.

Frustrated: Performance with a response time greater than F seconds is unacceptable, and users may abandon the process.

The web service calculates an Apdex using the retrieved historical network monitoring data matching the input parameters in the request (404). The web service also calculates the RTMPI using the retrieved historical data matching the predetermined parameters (405). The Apdex formula is the number of satisfied samples plus half of the tolerating samples plus none of the frustrated samples, divided by all the samples. In this embodiment, the Apdex score is calculated using the following inputs:

Response times from historical data retrieved in Sample 1
    Total Sample size used in query for Sample 1
    Target Time (T)—Supplied from web service request
    Frustrated Time (F)—Supplied from the web service request. If omitted, the Frustrated Time will be calculated by multiplying the Target Time by 4.

In this embodiment, the RTMPI score is calculated using the following consistent RTMPI inputs:

Response times from historical data retrieved in Sample 2
    Sample size of 100 or what was used in Sample 2
    Target Time of 1 second
    Frustrated Time of 4 seconds or 4T The predetermined parameters used for the RTMPI calculation are subject to change.

An Advertisement Delivery Determination Rating (ADDR) is a performance driven value that represents the most suitable advertising media type that should be used when advertisements are delivered to the device. The ratings lie on a spectrum between highest interactivity and richness on one end and lowest interactivity on the other. The following list contains Advertisement Delivery Determination Ratings in order from highest to lowest interactivity.

(V) Video—A rating that indicates the real-time performance for the device can support a highly interactive advertisement, such as an advertisement that combines visual effects and sounds to deliver messages to consumers.
    (TI) Text and Image—A rating that indicates the real-time performance for the device can support somewhat high interactivity, such as an advertisement that combines one or more images and text
    (I) Image—A rating that indicates the real-time performance for the device can support moderate interactivity, such as an image only advertisement
    (T) Text—A rating that indicates the real-time performance for the device can support low interactivity, such as a text only advertisement
    (NA) No Advertisement—A rating that indicates the real-time performance for the device is so poor it cannot support any advertisements.

Note: The list above is subject to change to support more advertisements and combinations of media An Advertisement Performance Determination Engine is provided the Apdex score, RTMPI score and input parameters for this request, which may include:

Wireless Carrier—The Wireless carrier the request pertains
    Device Location (Latitude/Longitude)—GPS latitude and longitude of the device the request pertains
    Device Altitude—Altitude of Device
    Time Zone Offset (Optional)—The time zone offset to be used in Web Service calculations
    Time of Day (Optional)—The time of day to be used in the Web Service calculations
    Day of Week (Optional)—The day of week to be used in the Web Service calculations
    Cellular generation (3g/4g, etc)—The generation value for the cellular network being used
    Request Direction—The direction of the payload transfer (Upload/Download).
    Protocol—The TCP/IP Protocol or other standardize transport mechanism used to transfer data. Example: http, websocket, stream, etc.
    Payload Size—The size of payload to be used in the Web Service calculations The Advertisement Performance Determination Engine calculates the ADDR using the Apdex score, RTMPI score and retrieved historical network monitoring data matching set of predetermined parameters (406).

The web service sends the results to the requestor (407) as a response to the request, using the response format supplied within the original request. If no response format was supplied, the response will be sent in XML format. The response will contain the following parameters.

Web Service Response Code—A code that demonstrates the success or failure of the request Apdex Score—A value from Zero to 1 indicating the numerical measure of user satisfaction calculated based upon all the input parameters supplied within the original request RTMPI Score—A value from Zero to 1 indicating the numerical measure of user satisfaction calculated based upon a subset of input parameters supplied within the original request coupled with a subset of consistent fixed parameters.

Figure 7:
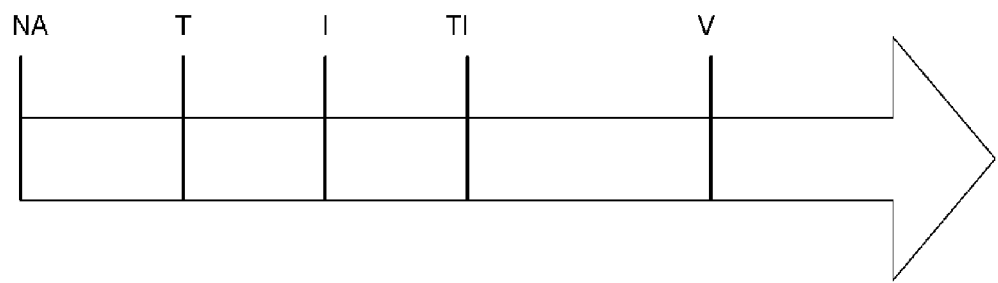
FIG. 7 illustrates an example ADDR.

ADDR Score—An Alphanumeric value that represents the most suitable advertising media type(s) that are appropriate based on the real-time performance predictions for the device. A list of one or more of the following values V, TI, I, T, NA. FIG. 7 illustrates an example ADDR.

Figure 6:
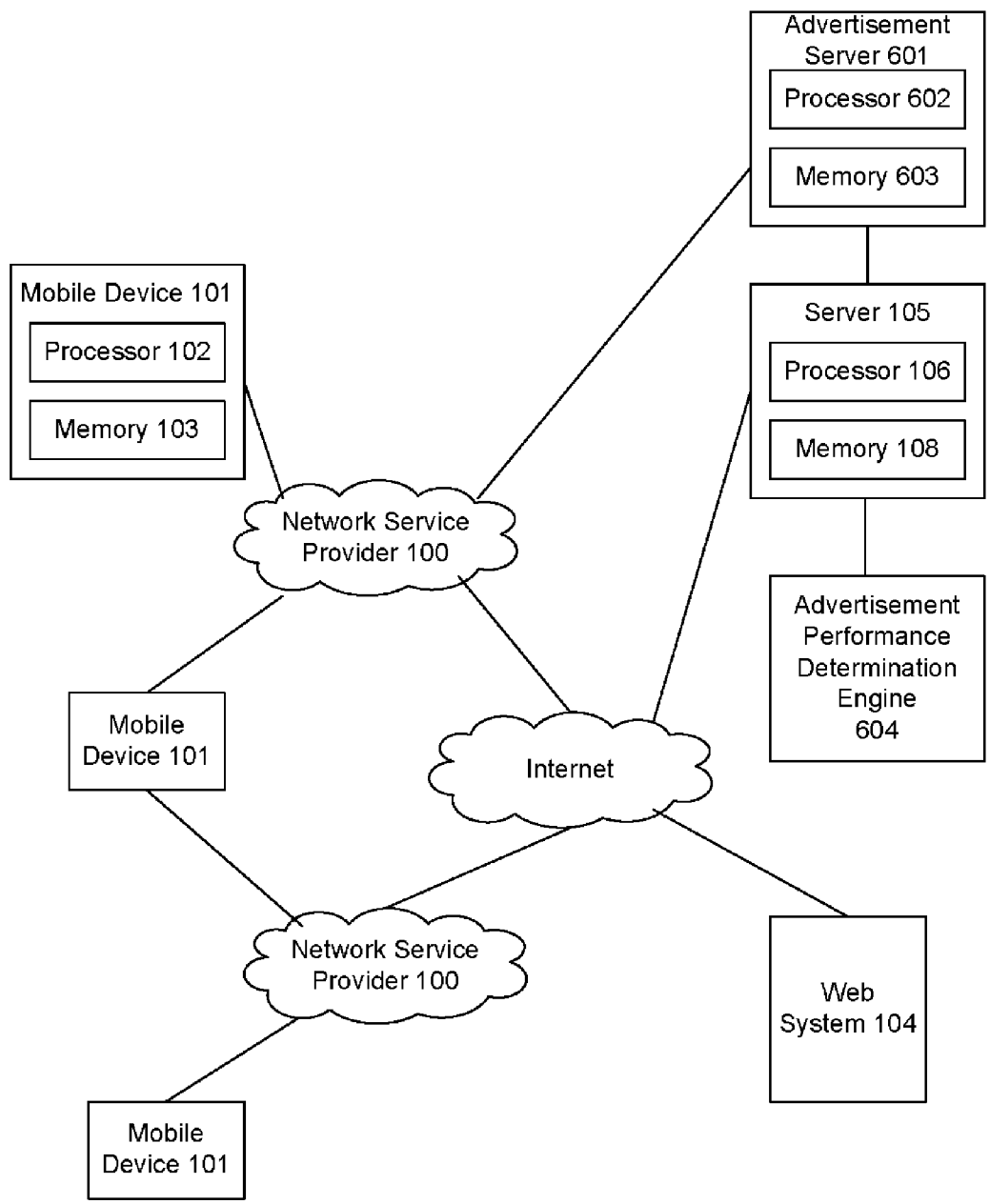
FIG. 6 illustrates another embodiment of the system for remote and real-time network transaction monitoring according to the present invention.

FIG. 6 illustrates another embodiment of the system for remote and real-time network transaction monitoring according to the present invention. In this embodiment, the system comprises the components illustrated in FIG. 1, and in addition, comprises an advertisement server 601 and an advertisement performance determination engine 604. The advertisement server is operationally coupled to a processor 602 and a computer readable medium, such as a memory 603. The computer readable medium 603 stores computer readable program code for implementing the ADDR, as described above. The advertisement server 601 further generates the advertisement according to the ADDR and provides the advertisement to the mobile device 101. The advertisement server 601 may be part of or separate from the server 105. In this embodiment, the advertisement performance determination engine 604 comprises a software module, which when executed by a processor, receives as input the Apdex, the RTMPI, and the retrieved historical network monitoring data matching the set of predetermined parameters. The advertisement performance determination engine 604 calculates the ADDR based on these inputs. The ADDR is then provided to the server 105 or 601.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for remote and real-time network transaction monitoring by a mobile device comprising a processor, comprising:
(a) receiving, by the processor, an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction;
(b) obtaining, by the processor, location and network connectivity data for the mobile device;
(c) during the execution of each step of the business transaction, recording, by the processor, the transport protocol events according to the configuration parameters; and
(d) associating, by the processor, the recorded transport protocol events with the location and network connectivity data for the mobile device, wherein the transport protocol events comprises:
an amount of time for the mobile device to establish a connection with the remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system.

2. The method of claim 1, wherein the receiving (a) comprises:
(a1) receiving, by the processor, a list of instruction sets from a server system, each given instruction set on the list comprising settings for steps of a given business transaction and configuration parameters for transport protocol events to record for each step of the given business transaction.

3. A method for remote and real-time network transaction monitoring by a mobile device comprising a processor, comprising:
(a) receiving, by the processor, an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction, wherein the receiving comprises:
(a1) receiving, by the processor, a list of instruction sets from a server system, each given instruction set on the list comprising settings for steps of a given business transaction and configuration parameters for transport protocol events to record for each step of the given business transaction;
(b) obtaining, by the processor, location and network connectivity data for the mobile device, wherein for each given instruction set on the list, the obtaining (b) comprises:
(b1) obtaining, by the processor, the location and network connectivity data for the mobile device for the given instruction set;
(b2) performing, by the processor, latency and packet loss tests for the given instruction set; and
(b3) calculating, by the processor, a latency and a packet loss for the given instruction set according to results of the latency and packet loss tests;
(c) during the execution of each step of the business transaction, recording, by the processor, the transport protocol events according to the configuration parameters; and (d) associating, by the processor, the recorded transport protocol events with the location and network connectivity data for the mobile device, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system.

4. A method for remote and real-time network transaction monitoring by a mobile device comprising a processor, comprising:
(a) receiving, by the processor, an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction;
(b) obtaining, by the processor, location and network connectivity data for the mobile device;
(c) during the execution of each step of the business transaction, recording, by the processor, the transport protocol events according to the configuration parameters, wherein for each given step of the business transaction, the recording (c) comprises:
(c1) executing, by the processor, the given step of the business transaction according to the settings for the given step in the given instruction set;
(c2) capturing, by the processor, the transport protocol events for the given step according to the configuration parameters for the given step in the given instruction set; and
(c3) calculating, by the processor, metrics for the given step using the captured transport protocol events;
(d) associating, by the processor, the recorded transport protocol events with the location and network connectivity data for the mobile device, wherein the transport protocol events further comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system.

5. The method of claim 4, wherein the recording (c) further comprises:
(c4) calculating, by the processor, total transaction metrics for the business transaction using the calculated metrics for each given step of the business transaction.

6. The method of claim 5, wherein the associating (d) comprises:
(d1) associating, by the processor, the calculated total transaction metrics with the mobile device location and network connectivity data.

7. The method of claim 6, further comprising:
(e) displaying, by the processor, one or more of the calculated total transaction metrics on the mobile device.

8. The method of claim 1, further comprising:
(e) storing, by the processor, the recorded transport protocol events associated with the mobile device location and network connectivity data as historical network monitoring data.

9. The method of claim 8, further comprising:
(f) receiving, by a processor of a server, a request for a real-time predictive end-user satisfaction indicator, the request comprising input parameters to be used for the indicator;
(g) retrieving, by the processor of the server, the historical network monitoring data matching the input parameters in the request;
(h) retrieving, by the processor of the server, the historical network monitoring data matching one or more predetermined parameters;
(i) calculating, by the processor of the server, an Apdex using the retrieved historical network monitoring data matching the input parameters in the request;
(j) calculating, by the processor of the server, a real-time mobile performance index using the retrieved historical network monitoring data matching the predetermined parameters; and
(k) returning, by the processor of the server, the real-time predictive end-user satisfaction indicator comprising the calculated Apdex and the calculated real-time mobile performance index in response to the request.

10. The method of claim 9, wherein the input parameters comprise a network carrier name and a latitude and longitude of a location of a second mobile device.

11. The method of claim 10, wherein the input parameters further comprise a day of the week and a time of day.

12. The method of claim 11, wherein the input parameters further comprise one or more of the following:
a request direction;
an altitude of the second mobile device; and
a target time.

13. The method of claim 10, wherein the input parameters further comprise a cellular generation.

14. The method of claim 13, wherein the input parameters further comprise one or more of the following:
a request direction;
an altitude of the second mobile device; and
a target time.

15. The method of claim 9, wherein the predetermined parameters comprise one or more of the following:
a payload size;
a sample size; and
a request direction.

16. The method of claim 9, wherein the request further comprises a request for an advertisement delivery determination rating (ADDR) for indicating an advertising media type for an advertisement to be sent to the mobile device, wherein the method further comprises:
(l) calculating, by the processor of the server, the ADDR using the Apdex, the real-time mobile performance index, and the retrieved historical network monitoring data matching the predetermined parameters; and
(m) returning, by the processor of the server, the ADDR in response to the request.

17. A method for providing a real-time predictive end-user satisfaction indictor by a web system comprising a processor, comprising:
- (a) receiving, by the processor, a request for a real-time predictive end-user satisfaction indicator, the request comprising input parameters to be used for the indicator;
- (b) retrieving, by the processor, historical network monitoring data matching the input parameters in the request, wherein the historical network monitoring data comprises transport protocol events recorded during executions of steps of business transactions over networks by a plurality of mobile devices, wherein each transport protocol event comprises an incident marking a start of a state, a change of a state, or a completion of a state according to a transport protocol during the executions of the business transactions, wherein the transport protocol events comprises:
- an amount of time for a mobile device to establish a connection with a remote web system;
- an amount of time for the mobile device to negotiate a secure sockets layer handshake;
- an amount of time for one or more redirects to occur;
- an amount of time for the mobile device to receive a first byte of data from a web system to which the mobile device connects for the business transaction; and
- an amount of time for the mobile device to receive a last byte of data from the web system;
- (c) retrieving, by the processor, historical network monitoring data matching one or more predetermined parameters;
- (d) calculating, by the processor, an Apdex using the retrieved historical network monitoring data matching the input parameters in the request;
- (e) calculating, by the processor, a real-time mobile performance index using the retrieved historical network monitoring data matching the predetermined parameters; and
- (f) returning, by the processor, the real-time predictive end-user satisfaction indicator comprising the calculated Apdex and the calculated real-time mobile performance index.

18. The method of claim 17, wherein the calculating (c) comprises:
- applying corrective and predictive algorithms to the real-time mobile performance index.

19. The method of claim 18, wherein the input parameters comprise a network carrier name and a latitude and longitude of a location of a second mobile device.

20. The method of claim 19, wherein the input parameters further comprise a day of the week and a time of day.

21. The method of claim 20, wherein the input parameters further comprise one or more of the following:
- a request direction;
- an altitude of the second mobile device; and
- a target time.

22. The method of claim 19, wherein the input parameters further comprise a cellular generation.

23. The method of claim 22, wherein the input parameters further comprise one or more of the following:
- a request direction;
- an altitude of the second mobile device; and
- a target time.

24. The method of claim 17, wherein the predetermined parameters comprise one or more of the following:
- a payload size;
- a sample size; and
- a request direction.

25. The method of claim 17, wherein the request further comprises a request for an advertisement delivery determination rating (ADDR) for indicating an advertising media type for an advertisement to be sent to the mobile device, wherein the method further comprises:
- (l) calculating, by the processor of the server, the ADDR using the Apdex, the real-time mobile performance index, and the retrieved historical network monitoring data matching the predetermined parameters; and
- (m) returning, by the processor of the server, the ADDR in response to the request.

26. A computer program product for remote and real-time network transaction monitoring, the computer program product comprising:
- a computer readable memory device having computer readable program code embodied therewith, the computer readable program code configured to:
  - (a) receive an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction;
  - (b) obtain location and network connectivity data for the mobile device;
  - (c) during the execution of each step of the business transaction, record the protocol events according to the configuration parameters; and
  - (d) associate the recorded transport protocol events with the location and network connectivity data for the mobile device, wherein the transport protocol events comprises:
- an amount of time for the mobile device to establish a connection with the remote web system;
- an amount of time for the mobile device to negotiate a secure sockets layer handshake;
- an amount of time for one or more redirects to occur;
- an amount of time for the mobile device to receive a first byte of data from a web system to which the mobile device connects for the business transaction; and
- an amount of time for the mobile device to receive a last byte of data from the web system.

27. A computer program product for remote and real-time network transaction monitoring, the computer program product comprising:
- a computer readable memory device having computer readable program code embodied therewith, the computer readable program code configured to:
  - (a) receive an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction;

(b) obtain location and network connectivity data for the mobile device, wherein for each given instruction set on the list, the computer readable program code configured to obtain (b) is further configured to:
  (b1) obtain the location and network connectivity data for the mobile device for the given instruction set;
  (b2) perform latency and packet loss tests for the given instruction set; and
  (b3) calculate a latency and a packet loss for the given instruction set according to results of the latency and packet loss tests;
(c) during the execution of each step of the business transaction, record the protocol events according to the configuration parameters; and
(d) associate the recorded transport protocol events with the location and network connectivity data for the mobile device, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system.

28. A computer program product for remote and real-time network transaction monitoring, the computer program product comprising:
  a computer readable memory device having computer readable program code embodied therewith, the computer readable program code configured to:
    (a) receive an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction;
    (b) obtain location and network connectivity data for the mobile device;
    (c) during the execution of each step of the business transaction, record the protocol events according to the configuration parameters, wherein for each given step of the business transaction, the computer readable program code configured to record (c) is further configured to:
      (c1) execute the given step of the business transaction according to the settings for the given step in the given instruction set;
      (c2) capture the transport protocol events for the given step according to the configuration parameters for the given step in the given instruction set; and
      (c3) calculate metrics for the given step using the captured transport protocol events;
    (d) associate the recorded transport protocol events with the location and network connectivity data for the mobile device, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system.

29. The computer program product of claim 28, wherein the computer readable program code configured to record (c) is further configured to:
  (c4) calculate total transaction metrics for the business transaction using the calculated metrics for each given step of the business transaction.

30. The computer program product of claim 29, wherein the computer readable program code configured to associate (d) is further configured to:
  (d1) associate the calculated total transaction metrics with the mobile device location and network connectivity data.

31. The computer program product of claim 26, wherein the computer readable program code is further configured to:
  (e) store the recorded transport protocol events associated with the mobile device location and network connectivity data as historical network monitoring data.

32. A computer program product for providing a real-time predictive end-user satisfaction indictor, the computer program product comprising:
  a computer readable memory device having computer readable program code embodied therewith, the computer readable program code configured to:
    (a) receive a request for a real-time predictive end-user satisfaction indicator, the request comprising input parameters to be used for the indicator;
    (b) retrieve historical network monitoring data matching the input parameters in the request, wherein the historical network monitoring data comprises transport protocol events recorded during executions of steps of business transactions over networks by a plurality of mobile devices, wherein each transport protocol event comprises an incident marking a start of a state, a change of a state, or a completion of a state according to a transport protocol during the executions of the business transactions, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system;
    (c) retrieve historical network monitoring data matching one or more predetermined parameters;
    (d) calculate an Apdex using the retrieved historical network monitoring data matching the input parameters in the request;
    (e) calculate a real-time mobile performance index using the retrieved historical network monitoring data matching the predetermined parameters; and
    (f) return the real-time predictive end-user satisfaction indicator comprising the calculated Apdex and the calculated real-time mobile performance index.

33. A system, comprising:
a plurality of mobile devices, each mobile device comprising a processor and a computer readable memory device having computer readable program code embodied therewith, the computer readable program code configured to:
  receive an instruction set for executing and monitoring a business transaction over a network, the instruction sets comprising settings for steps of the business transaction and configuration parameters for transport protocol events to record for each step of the business transaction, each transport protocol event comprising an incident marking a start of a state, a change of a state, or a completion of a state according to a transport protocol during the execution of the business transaction, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system;
  obtain location and network connectivity data for the mobile device;
  during the execution of each step of the business transaction, record the protocol events according to the configuration parameters, wherein for each given step of the business transaction, the computer readable program code configure to record the protocol events is further configured to:
    execute the given step of the business transaction according to the settings for the given step in the given instruction set;
    capture the transport protocol events for the given step according to the configuration parameters for the given step in the given instruction set; and
    calculate metrics for the given step using the captured transport protocol events;
  associate the recorded transport protocol events with the location and network connectivity data for the mobile device; and
  send to a server system the recorded transport protocol events associated with the mobile device location and network connectivity data; and the server system comprising a storage for storing the recorded transport protocol events associated with the mobile device location and network connectivity data, received from each of the mobile devices, as historical network monitoring data.

34. A web system, comprising:
a processor;
a storage storing historical network monitoring data comprises transport protocol events recorded during executions of steps of business transactions over networks, wherein each transport protocol event comprises an incident marking a start of a state, a change of a state, or a completion of a state according to a transport protocol during the executions of the business transactions by a plurality of mobile devices, wherein the transport protocol events comprises:
an amount of time for a mobile device to establish a connection with a remote web system;
an amount of time for the mobile device to negotiate a secure sockets layer handshake;
an amount of time for one or more redirects to occur;
an amount of time for the mobile device to receive a first byte of data from a web system to which the mobile device connects for the business transaction; and
an amount of time for the mobile device to receive a last byte of data from the web system; and
a computer readable memory device having computer readable program code embodied therewith, the computer readable program code configured to:
  receive a request for a real-time predictive end-user satisfaction indicator, the request comprising input parameters to be used for the indicator;
  retrieve the historical network monitoring data matching the input parameters in the request;
  retrieve the historical network monitoring data matching one or more predetermined parameters;
  calculate an Apdex using the retrieved historical network monitoring data matching the input parameters in the request;
  calculate a real-time mobile performance index using the retrieved historical network monitoring data matching the predetermined parameters; and
  return the real-time predictive end-user satisfaction indicator comprising the calculated Apdex and the calculated real-time mobile performance index.

* * * * *